United States Patent [19]
Chao et al.

[11] 3,729,987
[45] May 1, 1973

[54] METHOD AND APPARATUS FOR MEASURING SLURRY CONCENTRATION AND VELOCITY DISTRIBUTION IN A SLURRY PIPELINE

[75] Inventors: Junn-Ling Chao, Pasadena, Calif.; Moye Wicks, III; Thomas W. Pounds, both of Houston, Tex.

[73] Assignee: Shell Oil Company, Houston, Tex.

[22] Filed: Sept. 17, 1971

[21] Appl. No.: 181,488

[52] U.S. Cl. ............................ 73/61 R, 73/212
[51] Int. Cl. ................................... G01n 15/06
[58] Field of Search ..................... 73/61 R, 212

[56] References Cited

UNITED STATES PATENTS 3,543,565  12/1970  De Koning et al. ............... 73/61 R

FOREIGN PATENTS OR APPLICATIONS 211,147  4/1968  U.S.S.R. ........................ 73/61 R

*Primary Examiner*—Louis R. Prince
*Assistant Examiner*—Joseph W. Roskos
*Attorney*—Theodore E. Bieber et al.

[57] ABSTRACT

A method and apparatus for measuring the slurry concentration and velocity distribution in a pipeline wherein a first probe is used to determine the velocity at a predetermined position in the pipeline and a sample probe is then moved to the position and sampling rate adjusted until the velocity response to the two probes are equal. The local value of the velocity is obtained by dividing volume per unit of time of the sample by the cross-sectional area of the probe while the slurry concentration and particle size distribution are obtained by analysis.

6 Claims, 1 Drawing Figure

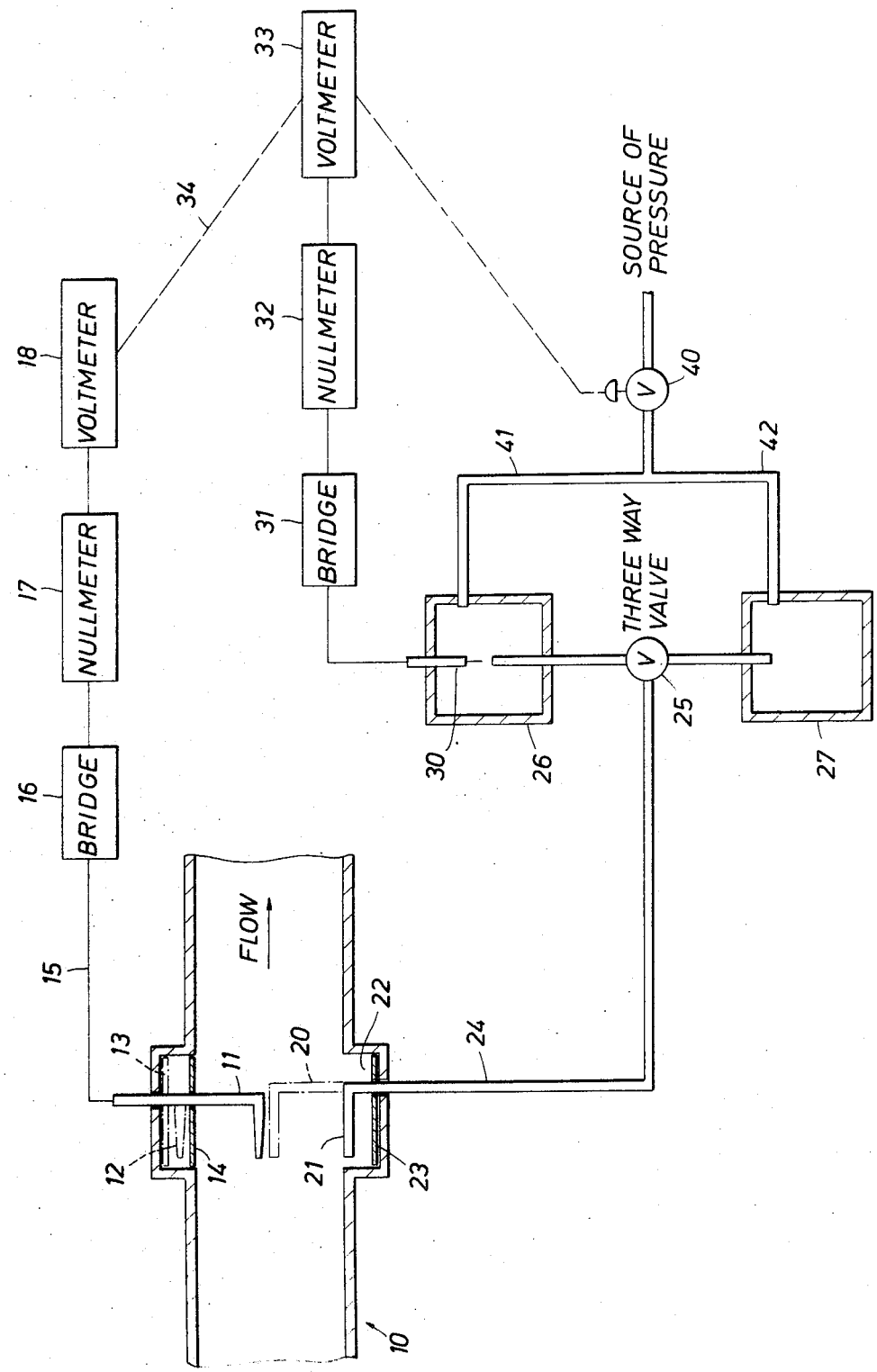

METHOD AND APPARATUS FOR MEASURING SLURRY CONCENTRATION AND VELOCITY DISTRIBUTION IN A SLURRY PIPELINE

BACKGROUND OF THE INVENTION

In a slurry pipeline, it is desirable to know both the velocity profile and the slurry concentration at various points across the pipeline. This information is required in order that the operation of the pipeline may be maintained under conditions that insure that the slurry remains in suspension. In slurry pipelines, if steps are not taken to maintain the proper velocity distribution across the pipeline, it is possible for the solids to concentrate and plug the pipeline. When this occurs it is of course necessary to shut down the pipeline and re-establish the solid material in suspension to form a slurry.

Normally the slurry concentration is measured for the bulk of the pipeline and no accurate indication is obtained of the exact slurry concentration at particular points across the pipeline. While these measurements are useful, it is impossible to tell the exact conditions existing in the pipelines from such measurements.

BRIEF DESCRIPTION OF THE INVENTION

The present invention solves the above problems by providing a velocity profile of the pipeline across the diameter of the pipeline. In addition, the slurry concentration is measured at each point at which a velocity measurement is made. Thus one obtains a complete measurement of both the velocity profile and the slurry concentration across the diameter of the pipeline.

The above measurements are obtained by means of a velocity probe which is moved into a position in the pipeline for making a velocity measurement. After the velocity measurement is made, the probe is retracted and a sampling probe moved into the position formerly occupied by the velocity probe. The flow through the slurry sampling probe is controlled to obtain the same velocity as was previously measured by the velocity probe. Once the isokinetic condition is established the time required to obtain a certain volume of sample can be measured and the velocity calculated while the slurry concentration for the particular point in the pipeline can be obtained from an analysis of the collected sample. The two probes can be moved to obtain a complete survey across a diameter of the pipeline.

BRIEF DESCRIPTION OF THE DRAWING

The invention will be more easily understood from the following description of the preferred embodiment when taken in conjunction with the attached drawing showing the invention installed in a pipeline.

DESCRIPTION OF THE PREFERRED EMBODIMENT

Referring to the enclosed drawing, there is shown the invention applied to a slurry pipeline 10. The velocity measuring probe 11 is mounted so that it may be extended into the pipeline as shown or retracted to a position indicated by the dotted outline 12. When retracted, the probe is positioned in a recess 13 formed in the wall of the pipeline. The probe may be any type of velocity-measuring device but is preferably a thermistor whose resistivity changes in response to the cooling effect of the slurry flowing in the pipeline.

The velocity probe is coupled by lead 15 to a bridge circuit 16 whose unbalance is measured by nullmeter 17. The nullmeter 17 balances the bridge and supplies a signal related thereto to a voltmeter 18. The voltmeter displays the magnitude of the unbalanced bridge signal.

The sampling probe 21 is mounted diametrically opposite the velocity probe and also provided with a means by which it may be moved into the pipeline to a dotted position 20. Both the sampling probe and the velocity measuring probe should be provided with sufficient movement so that they can completely traverse the pipeline to measure the velocity and sample the slurry flow at all positions. When the sampling probe is retracted, it rests in a recess 22 formed in the wall of the pipeline. A movable wall portion 23 is provided so that the wall of the pipeline will have a substantially smooth surface when the probe is extended into the pipeline.

The sampling probe is connected by a line 24 to a three-way valve 25 that is designed to couple the sampling probe either to a testing vessel 26 or to a collecting vessel 27. The testing vessel 26 is provided with a velocity measuring probe 30 which is substantially identical in its response characteristics to the velocity probe 11. The slurry sample is directed onto the velocity measuring probe 30 and the slurry flow is then adjusted until it exactly equals the flow in the pipeline. The velocity measuring probe 30 is coupled to a bridge circuit 31 whose output is supplied to a nullmeter 32 which in turn is coupled to a voltmeter 33. The voltmeter 33 displays a signal related to the unbalance of the bridge which signal is also supplied by a lead 34 to the voltmeter 18.

The flow through the sampling probe is controlled by varying the pressure within the testing vessel and the collecting vessels. The pressure may be supplied from any source of pressure such as a compressed air source by means of a control valve 40 and a line 41 connecting with the testing vessel 26 and a line 42 connecting with the collecting vessel 27. The control valve may be controlled by the signal from the voltmeter 33 so that the flow through the sampling probe is at the same velocity as previously measured by the velocity probe 11 at the same position in the pipeline. Also it is possible to supply the signal from the voltmeter 18 as a reference signal to the voltmeter 33 so that the voltmeter 33 can adjust the control valve to obtain the proper velocity through the sampling probe. When isokinetic conditions are established the signals from the two voltmeters will be equal.

In operation, the velocity probe 11 is first positioned at a desired location in the pipeline and a velocity measurement made. The signal representing this velocity measurement is then supplied as a reference signal to the voltmeter 33. The velocity probe is retracted into the recess in the sidewall of the pipeline and the sampling probe extended until it occupies the position formerly occupied by the velocity probe. The flow through the sampling probe is then adjusted by varying the pressure in the testing vessel 26 until the signal from the voltmeter 33 matches the signal from the reference signal from voltmeter 18. When the two signals match it indicates that the velocity in the sampling probe is the same as the velocity in the pipeline and isokinetic conditions have been established. The three-way valve 25 is then positioned to divert the flow from the sampling probe into the collecting vessel 27. A measured quantity of the slurry is collected while measuring the time required to collect the sample. Knowing the volume collected and the time, one can determine an accurate rate of flow in the pipeline. Likewise, one can determine the concentration of the slurry by an analysis of the sample collected in the vessel 27.

The rate of flow can be determined on a simple computer or a special dividing circuit can be provided for dividing the volume by time. Either of these steps can be carried out by one skilled in the art or a conventional dividing circuit using an operational amplifier may be used. The volume of the sample and time may be measured by commercially available equipment. A second operational amplifier can be used to divide the flow rate by the cross-section of the probe to obtain the velocity. While the slurry concentration can be obtained by a physical analysis of the sample, it can also be obtained automatically. The concentration is related to density which is proportional weight divided by volume. The weighing of the sample can be done by weigh cells or other devices that supply electrical signals related to weight. The concentration can then be obtained using a commercial dividing circuit.

The above procedure is repeated for a number of points across the pipeline to obtain an accurate profile of the rate of flow and the slurry concentration in the pipeline. Once sufficient data is obtained, one can plot the profile of the flow rate and the slurry concentration and determine what corrective steps, if any, are required.

The system can be further modified to fully automate both the positioning and retracting of the velocity and sampling probes as well as the matching of the voltmeter signals. Of course, for laboratory use a more simplified system is possible wherein the operator manually manipulates the control valve 40 and visually measures the collection of the required volume while noting the time required.

We claim as our invention:

1. A method for determining the velocity profile and solids concentration profile in a slurry pipeline comprising:

measuring the velocity at a first position in the pipeline;

sampling by means of a sample probe the slurry in said pipeline at said first position, while adjusting the sampling rate by discharging the sample from the sample probe onto a probe that is substantially identical to the probe used to measure the velocity in the pipeline so that the velocity in the sample probe equals the measured velocity at said first position;

collecting a known volume of sample while measuring the time required to collect the known volume of sample; and determining the velocity of slurry flow at said first position from said measured volume and the cross-sectional area of the sample probe.

2. An apparatus for measuring the velocity profile and slurry concentration in a slurry pipeline, said apparatus comprising:

a first velocity measuring probe, said velocity measuring probe being disposed to be extended into the pipeline and retracted to a position beyond the wall of the pipeline;

a first measuring circuit, said velocity probe being coupled to said first measuring circuit;

a sampling probe, said sampling probe being disposed to be extended into the pipeline and retracted to a position beyond the wall of the pipeline, a testing vessel, said sampling probe communicating with said testing vessel;

a second velocity measuring probe, said second velocity measuring probe being mounted in said testing vessel and disposed so that said sample probe discharges onto said second velocity measuring probe;

a second measuring circuit, said second velocity probe being coupled to said second measuring circuit;

flow control means disposed to control the flow through said sampling probe whereby the signal from said second measuring circuit may be varied to equal the signal from the first measuring circuit; and a collecting vessel, said sampling probe communicating with said collecting vessel.

3. The apparatus of claim 1 wherein said first and second velocity probes are thermistors.

4. The apparatus of claim 1 wherein said sampling probe communicates with said testing and said collecting vessels through a three-way valve.

5. The apparatus of claim 1 wherein said velocity probe and said sampling probe are mounted on diametrically opposite sides of said pipeline.

6. The apparatus of claim 1 wherein said flow control means comprises means for controlling the pressure in said testing and said collecting vessels.

* * * * *